United States Patent
Fini

(10) Patent No.: US 7,356,233 B2
(45) Date of Patent: Apr. 8, 2008

(54) SUPPRESSION OF TRANSVERSE MODES IN BANDGAP MICROSTRUCTURE OPTICAL FIBERS

(75) Inventor: John Michael Fini, Jersey City, NJ (US)

(73) Assignee: Furakawa Electric North America Inc., Norcross, GA (US)

( * ) Notice: Subject to any disclaimer, the term of this patent is extended or adjusted under 35 U.S.C. 154(b) by 38 days.

(21) Appl. No.: 11/403,787

(22) Filed: Apr. 13, 2006

(65) Prior Publication Data

US 2007/0242923 A1 Oct. 18, 2007

(51) Int. Cl.
G02B 6/02 (2006.01)
G02B 6/036 (2006.01)
G02B 6/028 (2006.01)
G02B 6/032 (2006.01)
G02B 6/26 (2006.01)
G02B 6/42 (2006.01)

(52) U.S. Cl. .......................... 385/126; 385/15; 385/27; 385/28; 385/30; 385/123; 385/124; 385/125; 385/127; 385/128

(58) Field of Classification Search ........ 385/123–128, 385/15, 27, 28, 30
See application file for complete search history.

(56) References Cited

U.S. PATENT DOCUMENTS

| | | | |
|---|---|---|---|
| 5,802,236 A | 9/1998 | DiGiovanni et al. | 385/127 |
| 5,907,652 A | 5/1999 | DiGiovanni et al. | 385/125 |
| 6,400,866 B2 | 6/2002 | Ranka et al. | 385/28 |
| 2002/0168161 A1* | 11/2002 | Price et al. | 385/123 |
| 2004/0151454 A1* | 8/2004 | Fajardo et al. | 385/126 |
| 2005/0105867 A1 | 5/2005 | Koch, III et al. | |
| 2006/0257071 A1 | 11/2006 | Bise et al. | |

FOREIGN PATENT DOCUMENTS

| | | |
|---|---|---|
| EP | 1722256 A2 | 11/2006 |
| WO | WO - 9964903 A | 12/1999 |
| WO | WO - 03/079077 A1 | 9/2003 |

OTHER PUBLICATIONS

J. M. Fini et al., "Distributed fiber filter . . . ," *Opt. Express*, vol. 13, No. 25, pp. 10022-10033 (Dec. 2005).
J. M. Fini et al., "Yb-doped amplifier fiber . . . ," *OFC*, paper OThj4 (3 pages), Anaheim, CA (Mar. 2006).
R. F. Cregan et al., "Single-Mode Photonic . . . ," *Science*, vol. 285, pp. 1537-1539 (Sep. 1999).

(Continued)

Primary Examiner—Frank G. Font
Assistant Examiner—Jerry Martin Blevins
(74) Attorney, Agent, or Firm—Michael J. Urbano

(57) ABSTRACT

An optical fiber comprises core and cladding regions configured to guide the propagation of light (or radiation) in the core region. The cladding region includes a periodic structure configured to produce light guiding by bandgap confinement. In order to suppress higher order odes (HOMs) in the core region, the cladding region includes at least one perturbation region configured so that a mode of the cladding region is resonant with a HOM of the core region. In a preferred embodiment of my invention, the perturbation region is configured so that the fundamental mode of the cladding region is resonant with a HOM of the core region.

24 Claims, 6 Drawing Sheets

OTHER PUBLICATIONS

T. A. Birks et al., "Endlessly singe-mode . . . ," *Opt. Lett.*, vol. 22, No. 13, pp. 961-963 (Jul. 1997).

F. Luan et al., "All-solid photonic . . . ," *Opt. Lett.*, vol. 29, No. 20, pp. 2369-2371 (Oct. 2004).

S. Fevrier et al., "Very large effective . . . ," *Electr. Lett.*, vol. 39, No. 17, pp. 1240-1242 (Aug. 2003).

C. Kerbage et al., "Integrated all-fiber . . . ," *App. Phys. Lett.*, vol. 79, No. 19, pp. 3191-3193 (Nov. 2001).

T. Hasegawa et al., "Band-insensitive single-mode . . . ," ECOC, paper We2.73 (2 pages), (2003).

K. Saitoh et al., "Bending-insensitive single-mode . . . ," *Opt. Lett.*, vol. 30, No. 14, pp. 1779-1781 (Jul. 2005).

M. Skorobogatiy, "Transverse lighwave circuits . . . ," *Opt. Express*, vol. 13, No. 19, pp. 7506-7515 (Sep. 2005).

P. J. Roberts et al., Ultimate low loss . . . , *Opt. Express*, vol. 13, No. 1, pp. 236-244 (Jan. 2005).

J. A. West et al., "Surface modes in air-core . . . ," *Opt. Express*, vol. 12, No. 8, pp. 1485-1496 (Apr. 2004).

H. K. Kim et al., "Designing Air-Core . . . ," *IEEE J. Quant. Electr.*, vol. 40, No. 5, pp. 551-556 (May 2004).

C. M. Smith et al., "Low-loss hollow-core . . . ," *Nature*, vol. 424, pp. 657-659 (Aug. 2003).

C. J. S. de Matos et al., "All-fiber chirped . . . ," *Opt. Express*, vol. 11, No. 22, pp. 2832-2837 (Nov. 2003).

N. Venkataraman et al., "Low Loss (13 dB/km) . . . ," *Proc. ECOC*, paper PD1.1 (2 pages), Copenhagen, Denmark (2001).

S. G. Johnson et al., "Low-loss asymptotically . . . ," *Opt. Express*, vol. 9, No. 13, pp. 748-779 (Dec. 2001).

R. Amezcua-Correa et al., "Realistic designs . . . ," *OFC*, paper OFC1 (3 pages), Anaheim, CA (Mar. 2006).

P.J. Roberts et al, :ultimate low loss fo hollow-core photonic crystal fibres; vol. 13, No. 1, Jan. 10, 2005, pp. 236-244; figure 1; p. 242.

John M. Fini: "Design of solid and microstucture fibers for suppression of higher-order modes", Optics Express, vol. 13, No. 9, May 2, 2005, pp. 3477-3490.

John M. Fini et al, "Microstructure fibres for optical sensing in gases and liquids", Measurement Science and Technology, Institute of Physics Publishing, Bristol, GB, vol. 15.

K. Saitoh et al, Design of photonic band gap fibers with suppressed higher-order modes...., Optics Express, vol. 14, No. 16, Aug. 7, 2006.

* cited by examiner

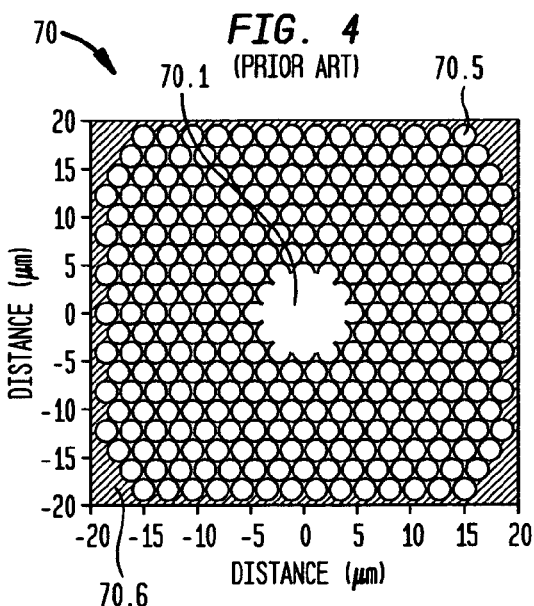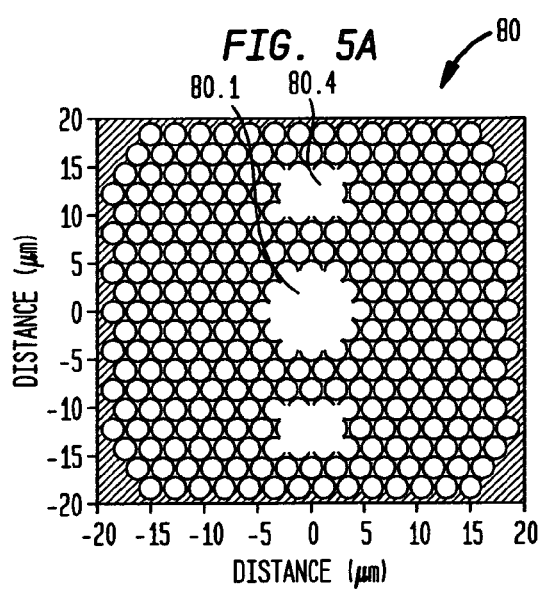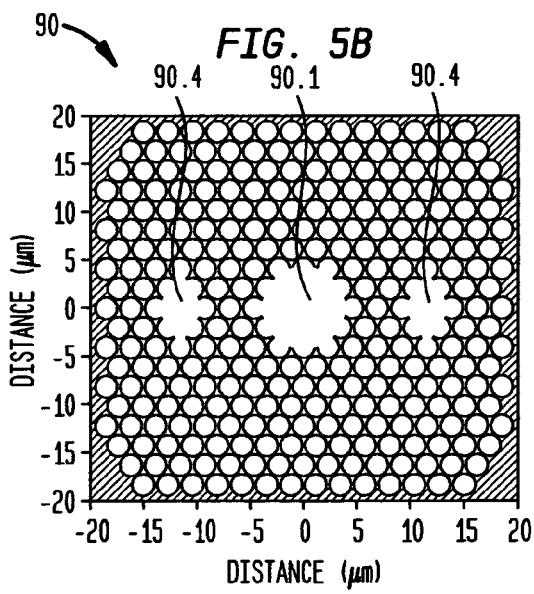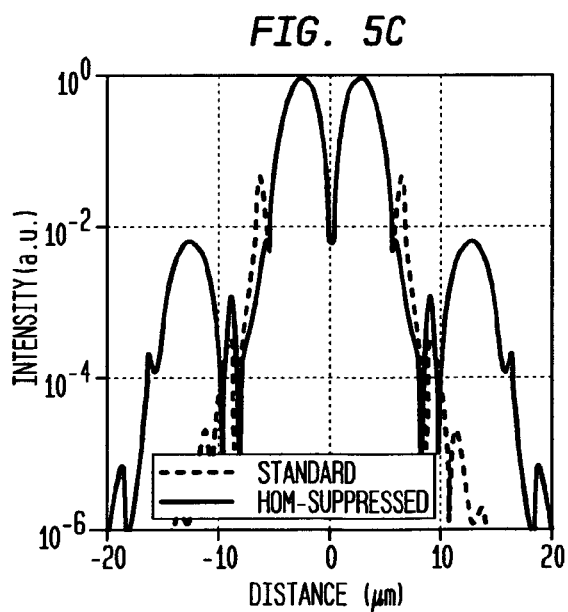

SUPPRESSION OF TRANSVERSE MODES IN BANDGAP MICROSTRUCTURE OPTICAL FIBERS

BACKGROUND OF THE INVENTION

1. Field of the Invention

This invention relates to microstructure optical fibers and, more particularly, to the suppression of preselected transverse modes in such fibers.

2. Discussion of the Related Art

Microstructure optical fibers (MOFs) guide light in a core region (e.g., an aircore) surrounded by a periodic index cladding region. Illustratively, the cladding region includes a matrix (or lattice) that defines a periodic array of air holes. When properly designed, an MOF can be made to exhibit bandgap confinement; that is, a range of wavelengths that support and guide the propagation of light modes bounded by ranges of wavelengths that do not support such propagation. Such fibers, are often referred to as bandgap fibers, typically have a core region that has a lower refractive index than that of the cladding region. In contrast, MOFs can also be designed to exhibit more traditional index guiding, in which case the core region has a higher refractive index than that of the cladding region.

Progress in aircore and other bandgap fibers has demonstrated that they can combine many of the material and manufacturing advantages of the standard fiber draw process with unique capabilities not possible in standard fibers. Aircore fibers have particularly interesting potential in data transmission, since the nonlinearity of aircore fibers is much smaller than standard fibers, dramatically changing the cost and performance of a transmission link. However, any long-distance transmission fiber must compete against the extremely low loss of standard fibers. Despite rapid improvements, it has been suggested that aircore fiber losses are approaching a fundamental limit and can be improved further only by increasing the core size or finding improved materials. [See, P. J. Roberts, et al., "Ultimate low loss of hollow-core photonic crystal fibres," *Opt. Express*, Vol. 13, p. 236 (2005), which is incorporated herein by reference.] Consequently, it would be very desirable to utilize larger core sizes, but larger cores generally support higher-order transverse modes (HOMs) and therefore experience well-known problems attendant such modes.

Hereinafter, the term mode shall mean transverse mode in both the singular and the plural.

Therefore, a need remains in the art for a bandgap MOF that has a relatively large core size yet suppresses HOMs.

BRIEF SUMMARY OF THE INVENTION

In accordance with one embodiment of my invention, a strategy for suppression of HOMs of bandgap MOFs is based on index-matched coupling (resonance) between core modes and cladding modes. Appropriate cladding features near the core cause light in the HOMs to resonantly couple between the core and cladding, while light in the fundamental mode remains well confined in the core. These cladding features (in an otherwise periodic cladding) significantly increase the loss of HOMs, with essentially no impact on fundamental mode confinement, which removes a significant obstacle in the development of larger-core, single-mode bandgap MOF fibers.

In a more general sense, and in accordance with one aspect of my invention, an optical fiber comprises core and cladding regions configured to guide the propagation of light (or radiation) in the core region in a first core mode. The cladding region includes a periodic structure configured to guide light by bandgap confinement. In order to suppress at least one second core mode, the cladding region includes at least one perturbation region configured to resonantly couple a perturbation mode to the at least one second core mode.

In a preferred embodiment, the core and perturbation regions are also configured to prevent any substantial amount of energy of the perturbation mode from coupling back into the second core mode.

In a further preferred embodiment of my invention, the core and perturbation regions are configured to resonantly couple the fundamental mode of the perturbation region to a HOM of the core region and to support propagation of the fundamental mode in the core region.

BRIEF DESCRIPTION OF THE SEVERAL VIEWS OF THE DRAWING

My invention, together with its various features and advantages, can be readily understood from the following more detailed description taken in conjunction with the accompanying drawing, in which:

FIG. 4 is a schematic, cross-sectional view of standard (prior art), aircore, bandgap MOF (Although the outer perimeter of the inner cladding appears to be square, it would typically be circular.);

FIGS. 5A and 5B are schematic, cross-sectional views of bandgap MOFs in accordance with two embodiments of my invention in which (5A) two oblong-like perturbation regions are symmetrically positioned above and below the core region, and (5B) two diamond-like perturbation regions are symmetrically positioned to the left and right of the core region (Although the outer perimeter of the inner cladding appears to be square, it would typically be circular.); and FIG. 5C compares optical intensity profiles of HOMs for both a standard bandgap MOF (dotted line curve) of the type shown in FIG. 4 and an HOM-suppressed MOF (solid line curve) of the type shown in FIG. 5B;

DETAILED DESCRIPTION OF THE INVENTION

General Principles of HOM Suppression

Figure 1:
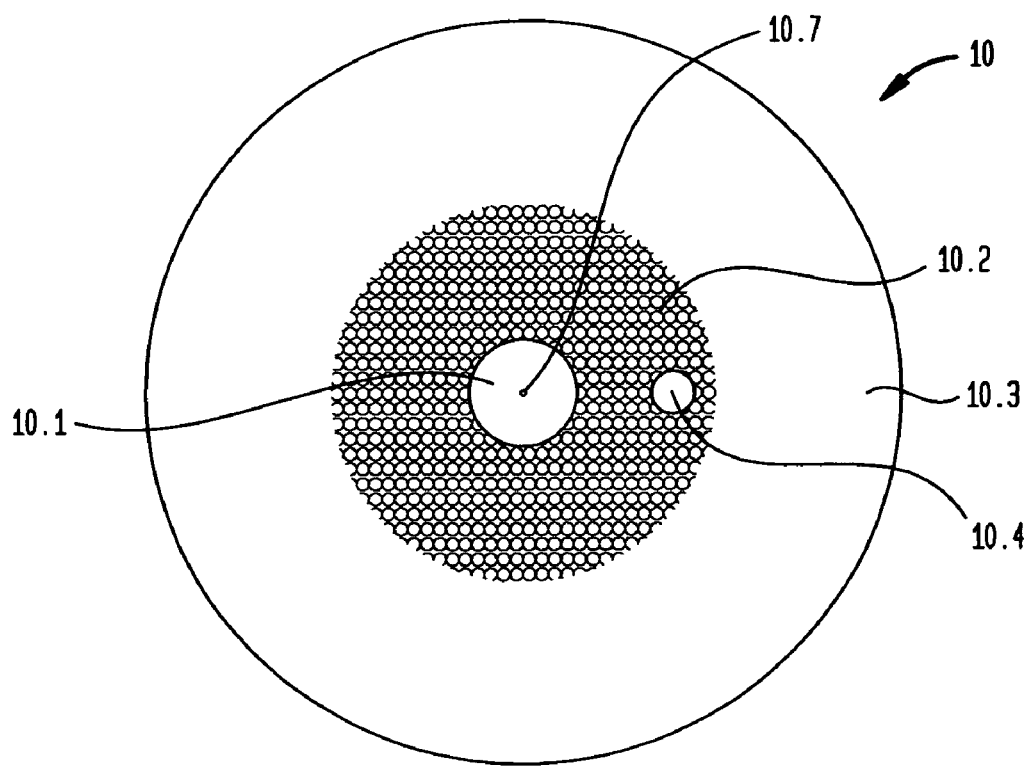
FIG. 1 is a schematic, cross sectional view of a bandgap MOF in accordance with one embodiment of my invention. The cross-section is taken perpendicular to the axis of propagation of the core region.
Figure 2A:
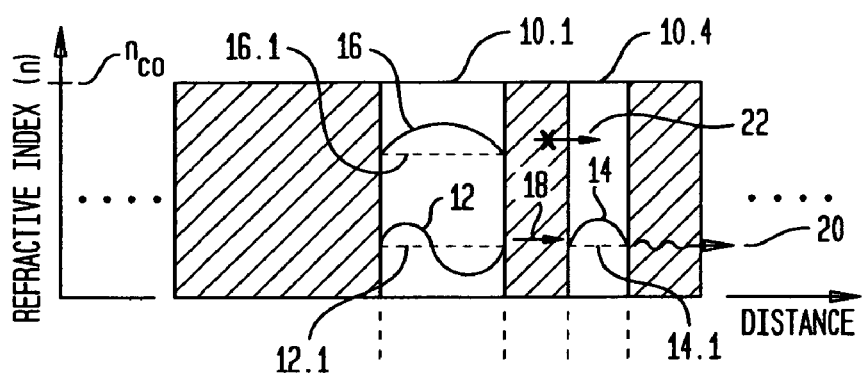
FIG. 2A is schematic graph of refractive index vs. radial distance of a bandgap MOF of the type shown in FIG. 1 having the core and perturbation regions shown in detail in FIG. 2B. The refractive index of the core region is labeled $n_{co}$. The core and perturbation regions are separated by cross-hatched bandgap regions. In the bandgap regions the propagation of light is excluded from the periodic regions of the cladding.
Figure 2B:
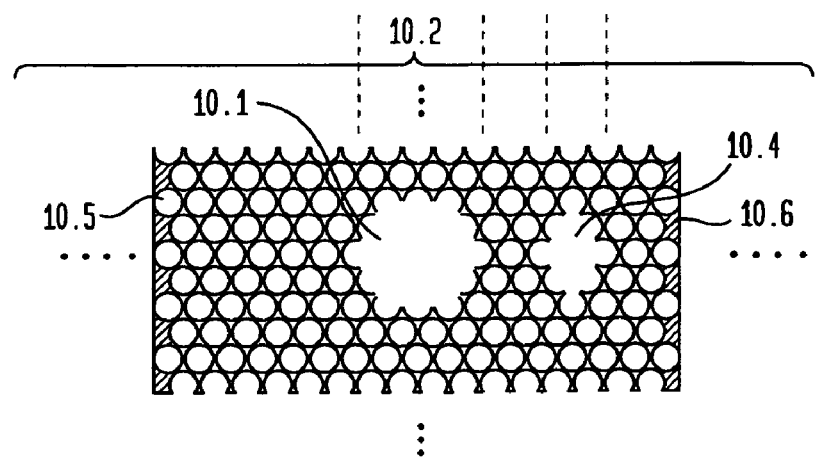
FIG. 2B is a cross-sectional view of a portion of a bandgap MOF of the type illustrated in FIG. 1 showing the core and perturbation regions in more detail.
Figure 3A:
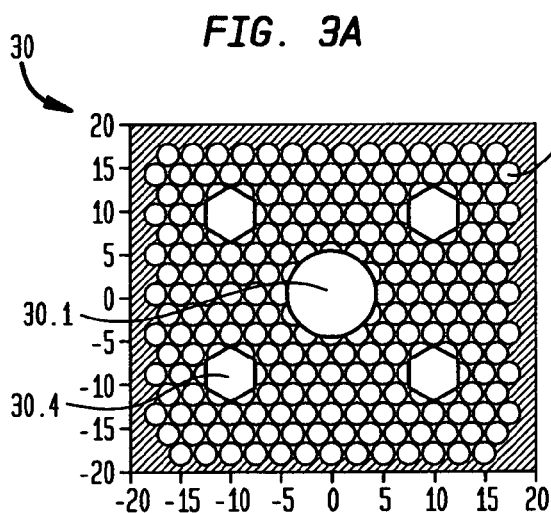
FIG. 3 shows schematic, cross-sectional views of bandgap MOFs in accordance with alternative embodiments of my invention: (3A) four air-guiding, essentially hexagonal, perturbation regions symmetrically positioned (at the four corners of a square) around a hollow, essentially circular, core region; (3B) three undoped, essentially hexagonal, perturbation regions symmetrically positioned (at the three corners of a triangle) around a doped, essentially circular, core region of an ARROW fiber; (3C) four hollow, gas-loaded, essentially rectangular, perturbation regions symmetrically positioned (at the four corners of a square) around a hollow, gas-loaded, essentially square, core region; and (3D) a ring of perturbation regions concentrically surrounding an essentially circular core region of a radial bandgap fiber.
Figure 3B:
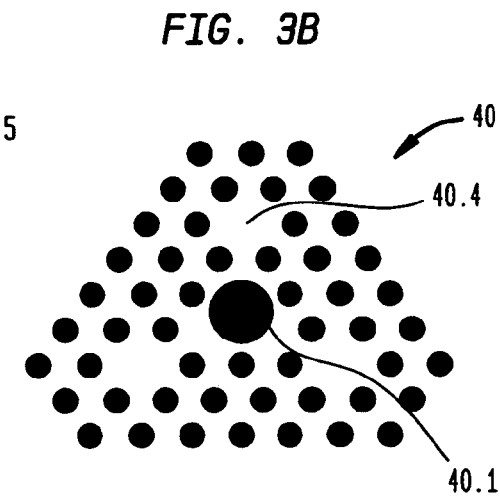
Figure 3C:
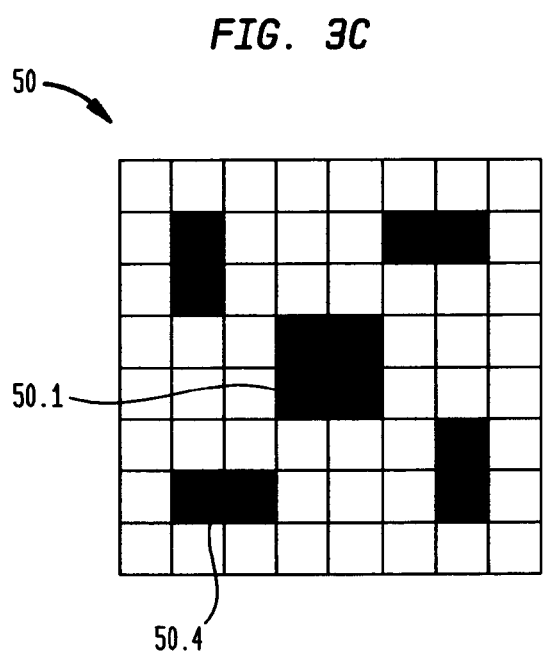
Figure 3D:
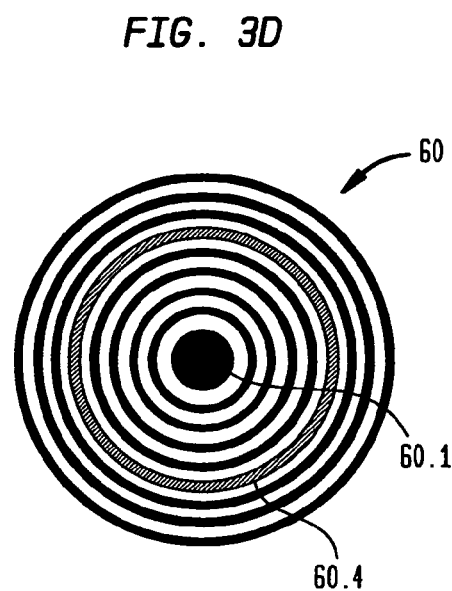

With reference now to FIGS. 1 and 2B, a bandgap MOF 10 comprises a core region 10.1, an inner cladding region 10.2 surrounding the core region 10.1, and an outer cladding region 10.3 surrounding inner cladding region 10.2. The core and cladding regions are configured to support and guide the propagation of light (or radiation) along the longitudinal axis 10.7 of the core region. To qualify as a bandgap fiber as that term is used herein, the inner cladding region 10.2 is configured to produce a periodic variation of its refractive index; e.g., by means of a solid matrix or lattice 10.6 forming an array of holes 10.5. The core region 10.1 has a lower refractive index than the effective refractive index of the inner cladding region 10.2. (Although not critical, the outer cladding region 10.3 typically has a refractive index higher than that of the inner cladding region 10.2. Light propagating in the core region 10.1 is guided therein by a resonant reflection condition (also known in the art as the bandgap condition) in the inner cladding region 10.2. This condition is also known a bandgap confinement.

In accordance with one aspect of my invention, as shown in FIGS. 1 and 2B, the inner cladding region 10.2 includes a perturbation region 10.4 wherein the periodicity of the refractive index is disrupted. The perturbation region 10.4 is configured so that at least one of its modes resonantly couples with at least one HOM of the core region 10.1. As shown in FIG. 2A, preferably HOM 12 (illustratively depicted as a $1^{st}$ order mode) of the core region 10.1 is resonant with the fundamental mode 14 of the perturbation region 10.4, whereas the fundamental mode 16 of the core region is not resonant with any mode of the perturbation region. By the terms resonant or resonantly couples I mean that the effective refractive index ($n_{eff}$) of a mode in the core region is essentially equal to that of a mode in the perturbation region. Thus, the $n_{eff}$ 12.1 of the $1^{st}$ order mode 12 of the core region is essentially equal to the $n_{eff}$ 14.1 of the fundamental mode 14 of the perturbation region, which allows energy in HOM 12 to transfer or couple (arrow 18) from the core region into fundamental mode 14 of the perturbation region and from there to radiate into the outer cladding region 10.3. (Arrow 20 indicates such radiation via leaky cladding modes, which are usually present.) This process of resonant transfer and radiation effectively suppresses HOM 12 in the core region. In contrast, $n_{eff}$ 16.1 of the fundamental mode 16 of the core region does not correspond to the $n_{eff}$ of any mode in the perturbation region. Consequently, the fundamental mode 16 propagates effectively in the core region, and no resonant transfer of its energy (arrow 22) into the perturbation region takes place.

The condition that a core mode and a perturbation mode have essentially equal refractive indices means, for example, that the core HOM index 12.1 and the perturbation fundamental mode index 14.1 are not so different that coupling of light between these modes is significantly frustrated. In a preferred embodiment of the invention, the difference between indices 12.1 and 14.1 is much less than the difference between the core fundamental mode index 16.1 and the perturbation fundamental mode index 14.1.

Proper coupling between the core mode to be suppressed and the resonant perturbation mode, should also take into account the need to suppress coupling of the latter perturbation mode back into the former core mode. To this end, a number of related fiber dimensions come into play. Qualitatively we consider the following; (1) the distance $D_1$ from the center of the core region to the outer edge of the inner cladding region. This distance controls the direct leakage rate of optical energy from the core region to unconfined radiation in the outer cladding region. This leakage rate decreases with increasing distance $D_1$; (2) the distance $D_2$ from the center of the perturbation region to the outer edge of the inner cladding region. This distance controls the direct leakage rate of optical energy from the perturbation region to unconfined radiation in the outer cladding region. This leakage rate increases with increasing distance $D_2$; (3) the center-to-center distance $D_3$ from the core region to the perturbation region. This distance controls the optical coupling between the resonantly coupled core and perturbation regions. This dimension can be understood as controlling the spatial overlap between the core and perturbation modes. Coupling decreases with increasing distance $D_3$; and (4) the size $D_p$ of the perturbation region relative to the size $D_{co}$ of the core region. The relative sizes (along with the refractive indices of the core and perturbation regions) control the degree of resonance between the coupled core and perturbation modes.

In general, the above-described dimensions should be chosen to allow effective leakage of unwanted core modes through the perturbation modes. More specifically, the leakage rate of the perturbation region should be larger than the direct leakage rate from the core region to radiation in the outer cladding. This condition translates into requiring that the distance from the perturbation region to the outer cladding should be less than the distance from the core region to the outer cladding region. In addition, the coupling between the core region and the perturbation region should not be so large that desired core modes are disrupted. On the other hand, the coupling between the core region and the perturbation region should not be too small that unwanted core modes will not couple sufficiently to perturbation modes to be suppressed. Next, the leakage rate of the perturbation mode should not be so large that coupling between the core and perturbation regions is frustrated (i.e., insufficient). Finally, the leakage rate of the perturbation mode should not be so small that unwanted core modes will experience too little loss to be effectively suppressed.

Adherence to these design principles assures that in the core region 10.1, for example, fundamental mode 16 is effectively propagated, whereas HOM 12 is effectively suppressed. The degree to which the HOM needs to be suppressed (or cut-off) depends on the particular application. Total or complete suppression is not demanded by many applications, which implies that the continued presence of a relatively low intensity HOM may be tolerable. In any event, suppressing HOMs improves system performance by, for example, reducing total insertion loss and lowering noise in the signal mode. In the remainder of this description, MOFs in accordance with my invention will be referred to as HOM-suppressed fibers.

The foregoing principles of resonant coupling (index matching) may also be applied to the suppression of multiple unwanted core modes either by resonantly coupling them to a single mode of a perturbation region or by resonantly coupling them to different modes of one or more perturbation regions, each core mode being resonant with a separate perturbation mode.

ALTERNATIVE EMBODIMENTS

The design and fabrication of MOFs are well known in art. The particular hexagonal silica matrix 10.6 of circular holes 10.5 shown in FIG. 2B is illustrative only. Other geometric shapes of the core and the holes and matrix may be suitable. Material other than silica may be employed. The core region 10.1 and/or the perturbation region 10.5 may be hollow or solid; if hollow, they may be filled with a gas (e.g., polluted air) or a liquid; if solid, they may be doped or undoped, but the solid material would typically have a refractive index different from that of the matrix. The core region and the perturbation region may be filled with different materials or with the same material. In addition, the core region 10.1 may be centered on the longitudinal axis of the MOF 10, as shown in FIGS. 1 and 3-5, or it may be located off center (not shown). The holes 10.5 of the cladding region may be hollow or solid; they may be filled with liquids or gases; they may contain material of a higher index or lower index than the matrix material surrounding the holes. Hollow regions of the core, cladding, or perturbation regions may be evacuated to eliminate unwanted materials.

The actual shapes of the core region 10.1 and of the perturbation region 10.4 in microscopic detail are irregular, following a scalloped boundary produced by the omitting portions of the matrix during fabrication. However, the inscribed, virtual boundary of the core region can be approximated by known geometric shapes. For example, in FIGS. 2B, 5B core regions 10.1, 90.1 are essentially hexagonal, whereas perturbation regions 10.4, 90.4 have the shape of an inscribed diamond; in FIGS. 3A and 3B the core regions 30.1, 40.1 are essentially circular, whereas the perturbation regions 30.4, 40.4 are essentially hexagonal; in FIG. 3C the core region 50.1 is square, whereas the perturbation regions 50.4 are essentially rectangular; in FIG. 3D the core region 60.1 is essentially circular, whereas the perturbation region 60.4 is essentially ring-like or annular; and in FIG. 5A the core region 80.1 is essentially hexagonal, whereas the perturbation regions 80.4 are essentially oblong.

FIG. 3 illustrates several implementations of my HOM-suppression scheme in a variety of different MOF geometries. Thus, FIG. 3A shows the inner cladding of an MOF 30 having a hollow air-filled essentially circular core region 30.1 and four essentially hexagonal perturbation regions 30.4 symmetrically positioned around the core region. FIG. 3B shows the essentially triangular inner cladding of an ARROW MOF 40 having a solid essentially circular core region 40.1 and three essentially hexagonal perturbation regions 40.4 symmetrically positioned around the core region. Illustratively, the core region 40.1 is doped, whereas the perturbation regions 40.4 are not. FIG. 3C shows the square inner cladding of an MOF 50 having a hollow essentially square core region 50.1 and four essentially rectangular perturbation regions 50.4 symmetrically positioned around the core region. The core region 50.1 and the perturbation regions 50.4 are illustratively filled with a fluid (e.g., a gas or a liquid). Finally, FIG. 3D shows the inner cladding of an MOF 60 having an essentially circular core region and a radial bandgap structure (i.e., ring-like or annular regions of material having different refractive index producing a requisite periodic variation in index) and a ring-like or annular perturbation region 60.4.

Although the foregoing discussion exemplifies core and perturbation regions having generally a variety of regular shapes, they may also have irregular shapes. In addition, the pattern of the perturbation regions may exhibit certain aspects of symmetry (as in FIGS. 3A-3D and 5A-5B) or asymmetry (as in FIGS. 1 and 2B).

The relative sizes of the core and perturbation regions, as determined by their smallest cross-sectional dimensions, can be readily understood from the following analysis. If the core and perturbation regions are filled with the same or essentially identical refractive index materials, then the perturbation region should have a smaller size than the core region, and may typically have its smallest dimension roughly half of that of the core. More generally, the core and perturbation regions may have different effective refractive indices, in which case the resonance condition [matching the effective refractive index of a core mode to be suppressed ($n_{eff,com}$) to a leaky perturbation mode ($n_{eff,p}$)] can be understood approximately by:

$$n_{eff,com} = n_{eff,p} \tag{1}$$

$$n_{eff,com} = n_{co} - (\tfrac{1}{2})(C_1 \lambda/2D_{co})^2 \tag{2}$$

$$n_{eff,p} = n_p - (\tfrac{1}{2})(C_2 \lambda/2D_p)^2 \tag{3}$$

$$n_{co} - (\tfrac{1}{2})(C_1 \lambda/2D_{co})^2 = n_p - (\tfrac{1}{2})(C_2 \lambda/2D_p)^2 \tag{4}$$

where, $n_{co}$ and $n_p$ are the refractive indices of the core and perturbation regions, respectively, $\lambda$ is the wavelength of the light, $D_{co}$ is the smallest cross-sectional dimension of the coreregion, and $D_p$ is the smallest cross-sectional dimension of the perturbation region. $C_1$ and $C_2$ essentially represent the number (of order unity) of transverse oscillations of the modes across dimension $D_{co}$ in the core region and $D_p$ in the perturbation region, respectively. Typically $C_1 \sim 2C_2 > C_2$. Accordingly, when $n_{co} = n_p$, equation (4) reduces to $$D_p/D_{co} \sim C_2/C_1 \sim \tfrac{1}{2} < 1, \tag{5}$$

which states that the size of the perturbation region is less than that of the core region. Conversely, filling the perturbation region with a material having a refractive index greater than or equal to that of the core region generally requires the perturbation region to be smaller than the core region. However lower refractive index in the perturbation region can allow the perturbation region to be made larger than that prescribed by equation (5).

Although equations (2) and (3) are good approximations for many MOF designs contemplated by my invention, other empirical, analytical or numerical methods common to waveguide design can be used to find solutions to equation (1), especially for those case where equations (2) and (3) do not apply.

Simulation Results

Simulations were performed using a finite difference mode solver very similar to that described by Guo. [See, S. Guo, et al., "Loss and dispersion analysis of microstructured fibers by finite-difference method," *Opt. Express*, Vol. 12, p. 3341 (2004), which is incorporated herein by reference.]

To demonstrate the efficacy of my invention numerically, I assumed the most common type of aircore MOF studied experimentally and theoretically in the prior art (i.e., the aircore MOF 70 of FIG. 4), and then incorporated perturbation regions according to the resonant mode strategy described above for suppressing HOMs in the core region (e.g., the MOFs 80 and 90 of FIGS. 5A and 5B, respectively). Thus, my simulations compared aircore MOF designs with and without HOM-suppression features (perturbation regions) in the inner cladding, but which were otherwise identical. The aircore MOF designs exhibited a bandgap and had low-loss aircore-guided modes in the 1.5 μm wavelength range. Perturbation regions were designed to have air-guided modes across the same wavelength range and to achieve resonance with air-guided HOMs of the core region.

My MOFs were designed to suppress surface modes in the core and inner cladding regions. Suppressing surface modes in either of these regions is important because they tend to degrade the spectrum. In particular, in forming the core and perturbation regions care was taken to ensure that each vertex (the matrix material at the intersection of three or more nested holes) was removed completely. [See, H. K. Kim, et. al., "Designing air-core photonic-bandgap fibers free of surface modes", *J. Quantum Electron.*, Vol. 40, No. 5, p. 551 (2004), which is incorporated herein by reference.] Alternatively, surface modes can be suppressed by forming a thin layer of matrix material between the inner cladding region and the outer perimeter of the core and perturbation regions. [See, R. Amezcua-Correa et al., "Realistic designs of silica hollow-core photonic bandgap fibers free of surface modes," OFC, Paper No. OFC1, pp. 1-3, March 2006, Anaheim, Calif., which is also incorporated herein by reference.]

FIG. 4 shows a standard, prior art aircore MOF 70 having a regular periodic inner cladding of circular holes 70.5 (d/Λ=0.94, as used in Kim, supra, hole spacing Λ=2.5 μm) formed in a silica matrix or lattice 70.6. The core region 70.1 is formed by removing all silica within an essentially central circular region of diameter=$D_{co}$=9 μm [See, Kim, supra.]. FIGS. 5A and 5B demonstrate two illustrative embodiments of HOM-suppressed MOF designs in accordance my invention. Additional silica is removed from the inner cladding regions of MOF 80 (FIG. 5A) and MOF 90 (FIG. 5B); thereby forming two oblong-shaped perturbation regions 80.4 (FIG. 5A), which are symmetrically disposed above and below the core region 80.1, and two diamond-shaped perturbation regions 90.4 (FIG. 5B), which are symmetrically disposed to the left and right of the core region 90.1. In MOF 80, ten of the glass vertices that make up the matrix are removed from each of the two perturbation regions 80.4. In MOF 90, eight glass vertices are removed from each of the two perturbation regions 90.4. The particular oblong and diamond shapes were chosen because the fundamental mode of such a region has an effective refractive index very close to the core region HOMs to be suppressed. In addition, the smallest cross-sectional dimension of the perturbation regions 80.4, 90.4 is roughly half of the diameter of the corresponding core regions 80.1, 90.1 (i.e., $D_p$=4.5 μm), which allows resonance between the HOM of the core region and the fundamental mode of the perturbation region in each case. In addition, the distance D1=20.6 μm for both MOFs 80 and 90, whereas the distance D2=7.6 and 8.75 μm and the distance D3=13.0 and 12.5 μm for MOFs 80 and 90, respectively.

Figure 7A:
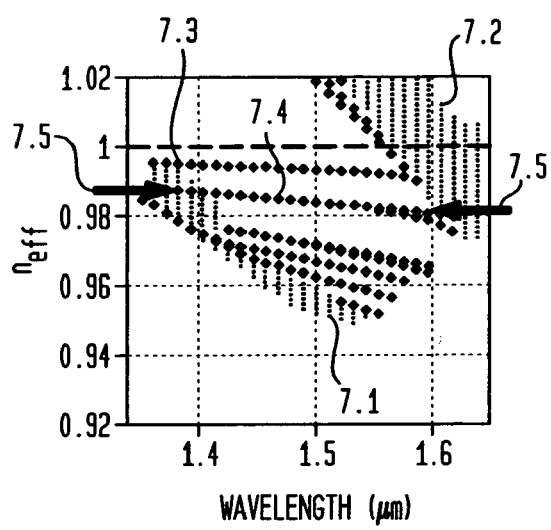
FIG. 7 is a set of graphs of effective refractive index vs. wavelength calculated for the core modes of (7A) a standard, aircore MOF 70 of the type shown in FIG. 4; (7B) shows modes of a perturbation region 80.4 of the type shown in FIG. 5A; and (7C) shows modes of a perturbation region 90.4 of the type shown in FIG. 5B.
Figure 7B:
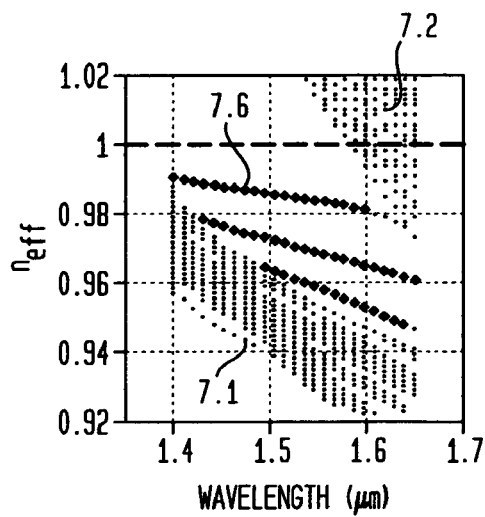
Figure 7C:
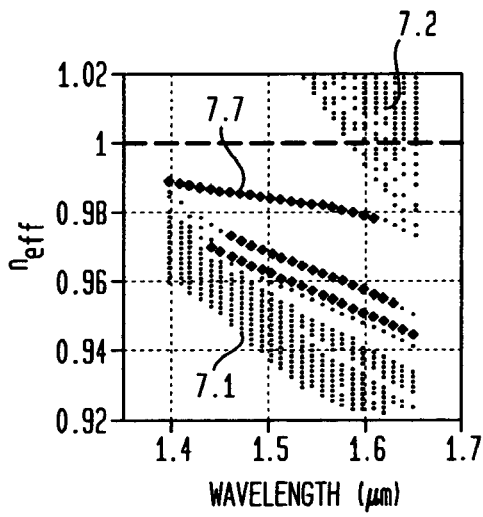

Index matching using the MOF designs of FIGS. 5A and 5B is demonstrated using $n_{eff}$ vs. wavelength graphs of FIGS. 7A-7C. In each of these graphs: (i) the bandgap at each wavelength is represented by the distance between the top of the lower vertically-hatched area 7.1 and the bottom of the upper vertically hatched area 7.2; and (ii) the dotted curves show the wavelength sensitivity of $n_{eff}$ of the various modes of the MOFs. Thus, in FIG. 7A, which is the characteristic of a standard MOF 70 (FIG. 4), curve 7.3 represents the fundamental mode of the core region, whereas curve 7.4 represents a HOM to be suppressed, which is indicated by the arrows 7.5 pointing to curve 7.4. By comparison, in FIG. 7B, which is the characteristic of MOF 80 (FIG. 5A), curve 7.6 represents the fundamental mode of the perturbation region 80.4, and in FIG. 7C, which is the characteristic of MOF 90 (FIG. 5B), curve 7.7 represents the fundamental mode of the perturbation region 90.4. It is important to note here that curves 7.4, 7.6 and 7.7 all have nearly the same $n_{eff}$; therefore, the $n_{eff}$ of the HOM of the core region 80.1, 90.1 of MOF 80, 90 is close to resonance with the fundamental mode of the perturbation region 80.4, 90.4, respectively. Consequently, the HOM of the core region can be suppressed by either type of perturbation region provided index matching is close enough, as shown in the following confinement loss plots. It is also important that the effective refractive index ($n_{eff}$) vs. wavelength (λ) curves 7.4, 7.6, and 7.7 all have essentially the same slope ($dn_{eff}/d\lambda$) within a range of operating wavelengths. Consequently, index-matched coupling and HOM suppression can be achieved over a relatively broad range of wavelengths (e.g., between 1.4 and 1.6 μm).

Figure 8A:
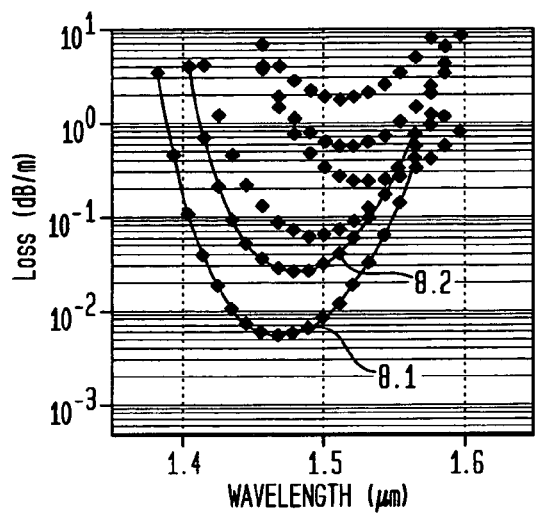
FIG. 8 is a set of graphs of mode loss vs. wavelength of (8A) a standard, aircore MOF 70 of the type shown in FIG. 4 and (8B) a bandgap MOF 80 of the type shown in FIG. 5A.
Figure 8B:
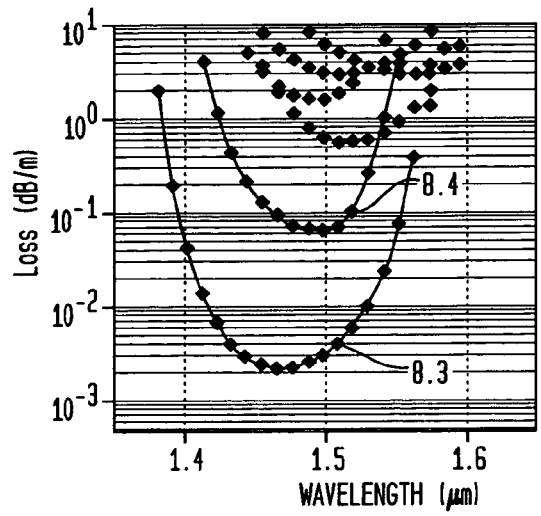

Confirmation of HOM suppression is seen in plots of mode confinement loss vs. wavelength (FIGS. 8A-8B). FIG. 8A shows calculated confinement losses for a standard prior art aircore MOF 70 (FIG. 4), and FIG. 8B shows similar losses for an HOM-suppressed MOF 80 having a pair of essentially oblong perturbation regions 80.4 above and below the core region 80.1 (FIG. 5A). In FIG. 8A, curve 8.1 represents the fundamental mode of the core region of the standard MOF 70 (FIG. 4), whereas curve 8.2 represents the lowest loss HOM of the same core region. Likewise, in FIG. 8B, curve 8.3 represents the fundamental mode of the core region of the HOM-suppressed MOF 80 (FIG. 5A), whereas curve 8.4 represents the lowest loss HOM of the same core region. In both cases, the fundamental mode (curves 8.1, 8.3) has the lowest loss in the 1.4 to 1.55 μm range. FIG. 8A shows that the lowest HOM loss for the standard MOF 70 (curve 8.2) is nearly as low as that of the fundamental for much of this range, which means that HOMs will be well confined and potentially very problematic in the standard MOF. In contrast, FIG. 8B shows that that the ratio of HOM to fundamental mode loss has been substantially increased. In fact, over a wide range of wavelengths, the introduction of the perturbation regions 80.4 simultaneously decreases the fundamental mode loss and increases the HOM loss. Both of these effects are desirable, but in the prior art typically one is achieved only at the expense of the other.

Figure 9A:
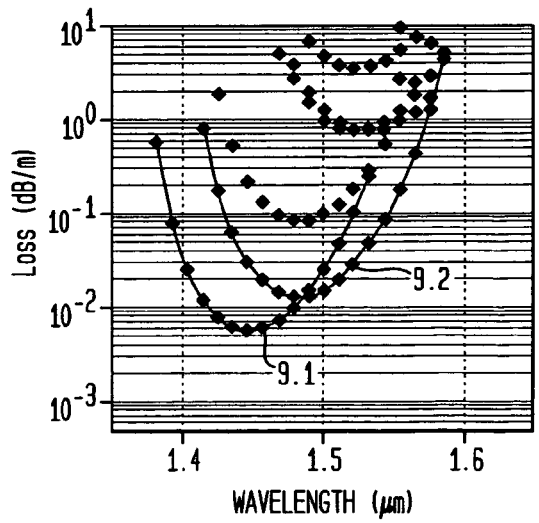
FIG. 9 is a set of graphs of mode loss vs. wavelength of (9A) a standard, aircore MOF 70 of the type shown in FIG. 4 and (9B) a bandgap MOF 90 of the type shown in FIG. 5B.
Figure 9B:
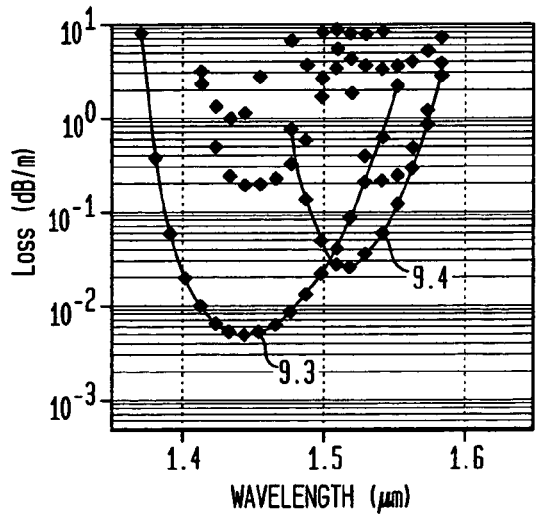

Similar simulations were also performed with using the design of MOF 90, as described below in conjunction with FIG. 9, which compares a slightly different standard aircore MOF 70 (FIGS. 4 and 9A) having a core region diameter=$D_{co}$=10 μm (instead of 9 μm) with the HOM-suppressed MOF 90 having a pair of diamond-shaped perturbation regions 90.4 to the left and right of the core region 90.1 (FIGS. 5B and 9B). In FIG. 9A, curve 9.1 represents the fundamental mode of the core region of the standard MOF 70 (FIG. 4), whereas curve 9.2 represents the lowest loss HOM of the same core region. Likewise, in FIG. 9B, curve 9.3 represents the fundamental mode of the core region of the HOM-suppressed MOF 90 (FIG. 5A), whereas curve 9.4 represents the lowest loss HOM of the same core region. In both cases, the fundamental mode (curves 9.1, 9.3) has the lowest loss in the 1.4 to 1.55 µm range. FIG. 9A shows that the lowest HOM loss for the standard MOF 70 (curve 9.2) is nearly as low as that of the fundamental mode for much of this range, which means that HOMs will be well confined and potentially very problematic in the standard MOF. In contrast, FIG. 9B shows that that the ratio of HOM-to-fundamental-mode loss has been increased. Again, the results indicate that incorporating perturbation regions 90.4 substantially increases losses for the relevant HOMs, while slightly reducing losses for the fundamental.

In addition to suppressing HOMs MOF designs in accordance with my invention substantially increase the usable bandwidth of the fiber. Consider FIG. 6, which compares mode loss vs. wavelength for a standard MOF 70 (FIG. 4) and a HOM-suppressed MOF 90 (FIG. 5B). Curves 6.1 and 6.2 correspond to the fundamental and HOM modes of the standard MOF 70, whereas curves 6.3 and 6.4 correspond to the fundamental and HOM modes of the HOM-suppressed MOF 90. Curves 6.1 and 6.3 indicate that the fundamental mode loss is essentially the same for both MOFs, but curves 6.2 and 6.4 indicate that the HOM loss is much larger for the HOM suppressed MOF 90 (curve 6.4) than for the standard MOF 70 (curve 6.2).

Note that curve 6.4 exhibits a double dip separated by a local peak, which can be explained as follows. The fiber has many HOMs but only the lowest loss HOM is plotted at each wavelength in FIG. 6 (and in FIGS. 8-9, as well). The double dips are caused by two different HOMs, at least one of which is suppressed in the core region. At longer wavelengths one these HOMs has the lowest loss, whereas at shorter wavelengths the other has lowest loss.

Figure 6:
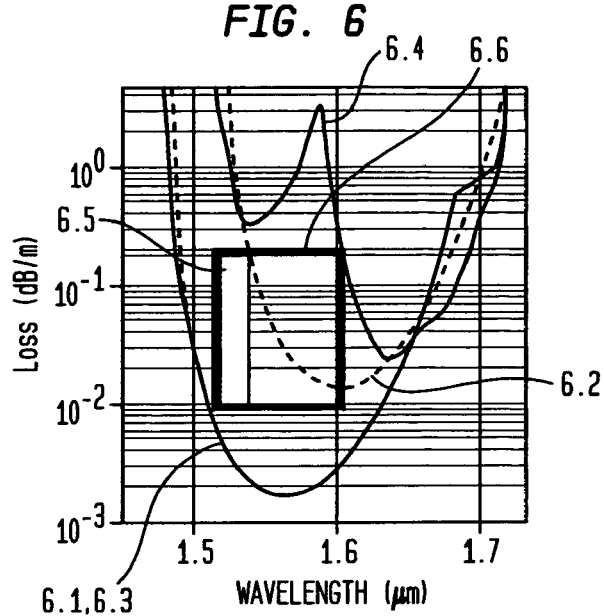
FIG. 6 is a graph of mode loss vs. wavelength calculated for the MOF 90 of FIG. 5B.

Consider further that an illustrative system requires fundamental mode loss less than 10 dB/km and HOM loss greater than 200 dB/km, under these conditions the standard MOF 70 has only 25 nm of useable bandwidth (FIG. 6; narrow rectangle 6.5) compared with 91 nm for the HOM-suppressed MOF 90 (FIG. 6; wider rectangle 6.6).

Intensity plots for the HOMs of MOFs 70 (FIG. 4) and 90 (FIG. 5B) are shown in FIG. 5C. More specifically, FIG. 5C, which shows the intensity plot of the modes of the HOM-suppressed MOF 90 at 1.538 µm, highlights the mode-coupling mechanism responsible for HOM suppression. Thus, for the standard MOF 70 (FIG. 4) the dotted line curve of FIG. 5C shows that the HOM is well confined to the core region and has little leakage through the cladding. In contrast, for the HOM-suppressed MOF 90 (FIG. 5B) the solid line curve of FIG. 5C shows small peaks at the perturbation regions. These peaks indicate resonant light coupling from the core region to the inner cladding region, which subsequently experiences leakage to radiation.

It is to be understood that the above-described arrangements are merely illustrative of the many possible specific embodiments that can be devised to represent application of the principles of the invention. Numerous and varied other arrangements can be devised in accordance with these principles by those skilled in the art without departing from the spirit and scope of the invention. In particular, although I described above how various fiber dimensions affect confinement losses, and hence prevent any substantial fraction of optical energy from coupling back from the perturbation region into the core region, it will be apparent to those skilled in the art that there are other ways to accomplish the same result; e.g., by use of absorption, scattering, fiber bends, mode coupling, or gain. Moreover, these techniques may be used separately or in combination with one another.

Figure 10:
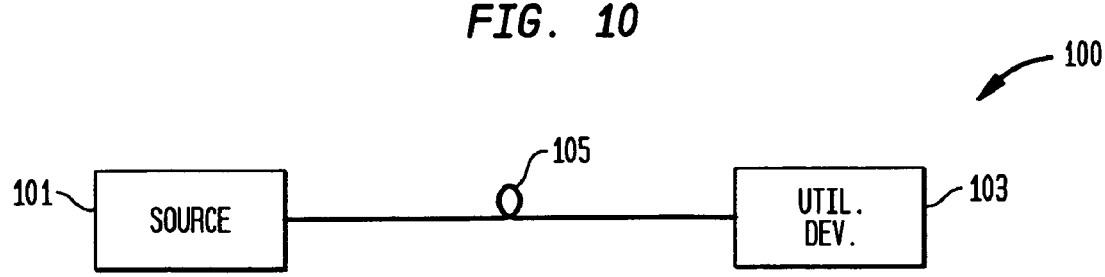
FIG. 10 is a schematic block diagram of a communication system utilizing a bandgap MOF, in accordance with another embodiment of my invention.
Figure 11:
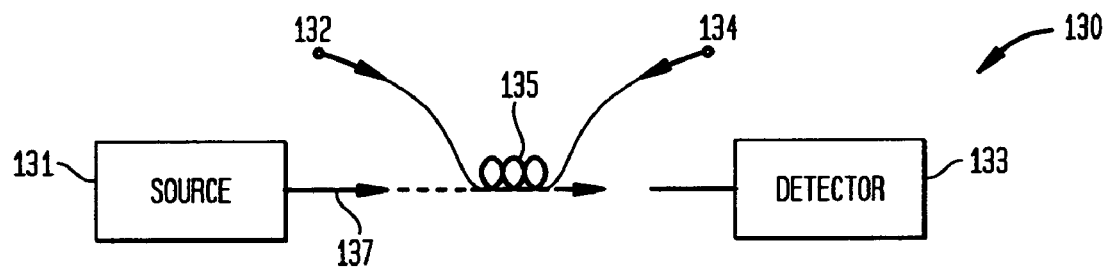
FIG. 11 is a schematic block diagram of a sensor system utilizing a bandgap MOF, in accordance with still another embodiment of my invention.
Figure 12:
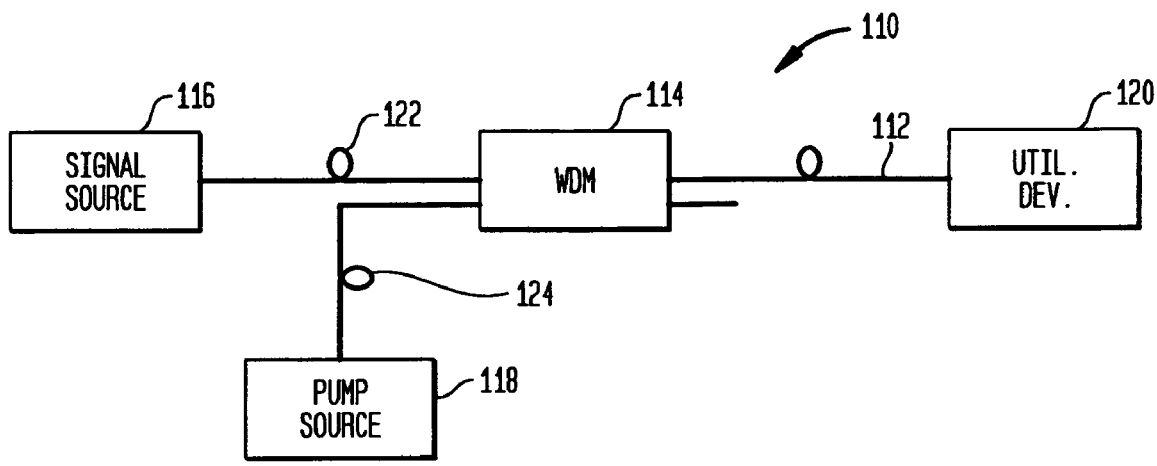
FIG. 12 is a schematic block diagram of an optical amplifier utilizing a bandgap MOF, in accordance with yet another embodiment of my invention.

In addition, it will also be apparent to those skilled in the art that the MOFs described above can be employed in a variety of applications, including communication systems or non-communication systems. An illustrative communication system 100 is shown in FIG. 10. Here, a transmission MOF 105 couples a source 101 of radiation/light to a utilization device 103, as shown in FIG. 10. An illustrative non-communication system (e.g., a sensor system 130) is shown in FIG. 11. Here, a MOF 135 having at least a hollow core is loaded with a fluid via entrance port 132. The fluid, for example, is a gas-containing a pollutant. A source 131 of light is coupled via optical path 137 (which may include suitable well-known couplers, lenses, etc, not shown) into the MOF 135, where it is absorbed by the pollutant. Absorption of light by the pollutant is sensed by the detector 133 as a change in, for example, the intensity of light at a wavelength associated with the pollutant. Fluid in the MOF 135 may be maintained in the MOF 135 in a static state or a dynamic (flowing) state. In either case, fluid may flow out of the fiber via exit port 134.

Alternatively, my MOFs may also be used in optical apparatus; e.g., in a rare-earth-doped fiber amplifier (REDFA) 110 of the type shown in FIG. 11. REDFA 110 comprises a rare-earth-doped MOF 112 in accordance with my invention, which optically couples a wavelength division multiplexer (WDM) 114 and a utilization device 120. The WDM 114 in turn couples the outputs of an optical input signal source 116 and an optical pump source 118 onto the MOF 112. The input signal source 116 generates a first-wavelength optical signal, which is coupled to an input of WDM 114 via a conventional fiber 122, whereas the pump source 118 generates a second-wavelength pump signal, which is coupled by a conventional fiber 124 to another input of WDM 114. As is well known in the art, the pump signal generates a population inversion in the MOR 112, which amplifies the optical signal from input source 116. The amplified signal propagates along MOF 112 to utilization device 120. The latter may include a myriad of well known devices or apparatuses; e.g., another amplifier, an optical receiver, an optical modulator, an optical coupler or splitter, or a piece of terminal equipment. Each of these is typically coupled to the MOF 112 via a standard pigtail connector (not shown).

Finally, I have illustrated above that my bandgap MOFs may contain gain materials (e.g., rare-earth elements added to the core region), but it will be apparent to those skilled in the art that they may also be designed to be birefringent or polarization-maintaining, or to have tunable bandgap properties.

I claim:

1. A bandgap microstructure optical fiber comprising:
   a core region having a longitudinal axis,
   a cladding region surrounding said core region, said core and cladding regions configured to support and guide the propagation of light in at least first and second transverse modes of said core region in the direction of said axis,
   said cladding region including an inner cladding region, the cross-section of said inner cladding region perpendicular to said axis having a periodic spatial variation of its refractive index configured to guide said light by bandgap confinement,
   said inner cladding region including at least one perturbation region that perturbs the periodicity of said index therein, said at least one perturbation region being configured to resonantly couple at least said second transverse mode of said core region to at least one transverse mode of said perturbation region, and said perturbation region being configured to suppress at least said second transverse mode.

2. The fiber of claim 1, wherein the effective refractive index of said second transverse mode of said core region and the effective refractive index of said transverse mode of said at least one perturbation region are essentially equal to one another.

3. The fiber of claim 1, wherein said inner cladding region includes a multiplicity of said perturbation regions at least two of which are symmetrically located on opposite sides of said core region.

4. The fiber of claim 3, wherein the cross-section of each of said perturbation regions perpendicular to said axis has an essentially oblong shape.

5. The fiber of claim 3, wherein the cross-section of each of said perturbation regions perpendicular to said axis each has an essentially diamond shape.

6. The fiber of claim 3, wherein the cross-section of each of said perturbation regions perpendicular to said axis each has an essentially hexagonal shape.

7. The fiber of claim 1, wherein said at least one perturbation region is configured to resonantly couple a transverse higher-order second mode of said core region to the fundamental transverse mode of said at least one perturbation region.

8. The fiber of claim 1, wherein said core region is hollow.

9. The fiber of claim 8, wherein said core region is filled with a fluid.

10. The fiber of claim 9, wherein said fluid is air.

11. The fiber of claim 1, wherein said core region is filled with a solid.

12. The fiber of claim 11, wherein said solid includes a dopant.

13. The fiber of claim 1, wherein the cross-sectional size of said core region perpendicular to said axis is larger than the cross-sectional size of said at least one perturbation region.

14. The fiber of claim 13, wherein the cross-sectional size of said core region perpendicular to said axis is approximately twice as large as the cross-sectional size of said at least one perturbation region.

15. The fiber of claim 3 wherein said multiplicity of perturbation regions is arranged in a ring centered on said axis.

16. The fiber of claim 1, wherein said core region and said at least one perturbation region are configured to prevent any significant flow of light energy from said at least one perturbation region into said core region.

17. The fiber of claim 16, wherein cladding region includes an outer cladding region surrounding said inner cladding region, and wherein said core region and said at least one perturbation region are configured to leak light energy from said at least one perturbation region into said outer cladding region.

18. The fiber of claim 2, wherein said fiber is configured to operate over a range of wavelengths, and wherein the effective refractive indices of said resonant transverse modes of said core and perturbation regions are essentially equal at a multiplicity of wavelengths within said range.

19. The fiber of claim 2, wherein said fiber is configured to operate over a range of wavelengths, and wherein the derivatives of the effective refractive index with respect to wavelength for said resonant modes of said core and perturbation regions are essentially equal to one another within said range.

20. The fiber of claim 1, wherein said at least one perturbation region is configured to resonantly couple multiple transverse modes of said core region to at least one transverse mode of said at least one perturbation region.

21. A transmission system comprising:

a source of optical radiation, a utilization device for receiving said radiation, and an optical fiber coupling radiation from said source to said utilization device, said fiber comprising said bandgap fiber of claim 1.

22. A sensor system comprising:

a source of optical radiation, a utilization device for detecting a change in a parameter of said radiation, and an optical fiber for coupling radiation from said source to said detector said fiber comprising said bandgap fiber of claim 1, wherein at least said core region contains a fluid that alters said parameter of said radiation, said detector being configured to detect said altered parameter.

23. An optical amplifier comprising:

a bandgap optical fiber according to claim 1 in which said core region contains a gain material for amplifying an optical signal propagating therein in response to pump energy applied thereto, a source of said pump energy, and a coupler for coupling said pump energy and said optical signal into said optical fiber.

24. A microstructure optical fiber comprising:

a core region having a longitudinal axis, a cladding region surrounding said core region, said core and cladding regions configured to support and guide the propagation of light in at least first and second transverse modes of said core region in the direction of said axis, said cladding region including an inner cladding region and an outer cladding region, the cross-section of said inner cladding region perpendicular to said axis having a periodic spatial variation of its refractive index configured to guide said light by bandgap confinement, and said inner cladding region including at least one perturbation region that perturbs the periodicity of said index therein, said at least one perturbation region being configured to resonantly couple at least said second transverse mode of said core region to at least one transverse mode of said perturbation region, wherein said core region and said at least one perturbation region are configured to prevent any significant flow of light energy from said at least one perturbation region into said core region, and wherein said core region and said at least one perturbation region are configured to leak light energy from said at least one perturbation region into said outer cladding region.

* * * * *